(No Model.)

P. PENNER.
HARNESS CHECK HOOK.

No. 362,533. Patented May 10, 1887.

Witnesses.
A. Rippert.
W. Purvis

Inventor.
Peter Penner
Per
Thomas P. Simpson
Atty.

UNITED STATES PATENT OFFICE.

PETER PENNER, OF McCOOK, NEBRASKA.

HARNESS CHECK-HOOK.

SPECIFICATION forming part of Letters Patent No. 362,533, dated May 10, 1887.

Application filed February 19, 1887. Serial No. 228,200. (No model.)

*To all whom it may concern:*

Be it known that I, PETER PENNER, a naturalized citizen of the United States, residing at McCook, in the county of Red Willow and State of Nebraska, have invented certain new and useful Improvements in Harness Check-Hooks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention will first be described in connection with the drawings, and then pointed out in the claim.

Figure 1:
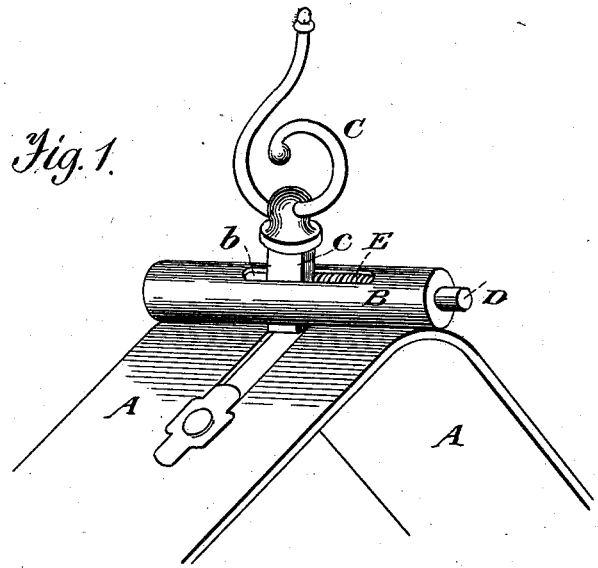
Figure 2:
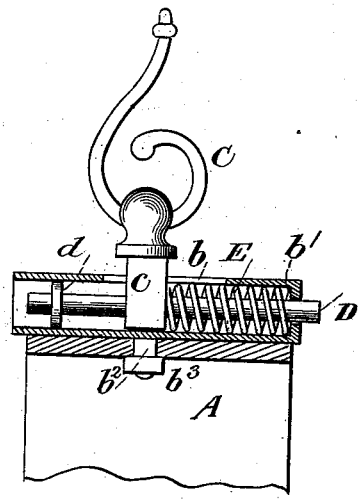
Figure 3:
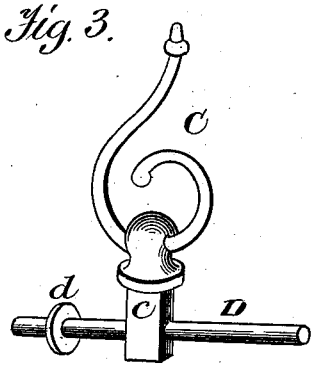

Figure 1 of the drawings is a perspective view; Fig. 2, a longitudinal vertical section, and Fig 3 a detail side elevation.

In the drawings, A represents a harness-saddle, and B a tube provided with the bottom screw, $b^2$, which passes through the saddle and is secured by a nut, $b^3$. This tube has a longitudinal top slot, $b$, and a front hole, $b'$, while the rear end is open.

D is a round pin passing through hole $b'$ in the front end and sustained by a collar, $d$, at the other end. On this pin is arranged a spiral spring, E, and behind it the vertical post $c$ of the check-hook C. This post has a hole through which the pin D passes, and slides loosely back and forth with the pin.

When the horse pulls on the check-rein, the spring E yields and the check-hook is carried forward; but as soon as he ceases to pull the check-hook is thrown back by the spring. This prevents the horse from sawing his mouth or hurting it by tossing his head; also prevents the hook or check-rein from breaking when the horse stumbles.

Having thus described my invention, I wish to acknowledge that it is not broadly new to hold or retract a check-hook by means of a spring; but

What I do claim as new, and desire to protect by Letters Patent, is—

The combination, with a harness-saddle, of the tube B, slotted at $b$, and having front hole, $b'$, a check-hook having the shank $c$ passing through said slot, and a pin, D, passing through said shank or post $c$, substantially as shown and described.

In testimony whereof I affix my signature in presence of two witnesses.

PETER PENNER.

Witnesses:
 HENRY F. WILLIAMS,
 W. H. ALLINSTON.